US012782988B2

(12) United States Patent
Yamada et al.

(10) Patent No.: US 12,782,988 B2
(45) Date of Patent: Nov. 3, 2026

(54) CURRENT OUTPUT DEVICE

(71) Applicant: Yokogawa Electric Corporation, Tokyo (JP)

(72) Inventors: Hidemaro Yamada, Tokyo (JP); Takeki Satou, Tokyo (JP); Koichi Irie, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 177 days.

(21) Appl. No.: 18/936,499

(22) Filed: Nov. 4, 2024

(65) Prior Publication Data

US 2025/0158527 A1 May 15, 2025

(30) Foreign Application Priority Data

Nov. 9, 2023 (JP) ................................ 2023-191706

(51) Int. Cl.
*G05F 1/577* (2006.01)
*G05F 1/56* (2006.01)

(52) U.S. Cl.
CPC .............. *G05F 1/561* (2013.01); *G05F 1/577* (2013.01)

(58) Field of Classification Search
CPC ................................ G05F 1/561; G05F 1/577
See application file for complete search history.

(56) References Cited

U.S. PATENT DOCUMENTS 3,729,671 A * 4/1973 Jeffery .................... G05F 1/577 363/78
5,155,385 A * 10/1992 Gotoh ................ H03M 1/0604 323/317
6,031,362 A * 2/2000 Bradley ........... H02M 3/33561 323/267
2006/0139065 A1 * 6/2006 Kojima ................ G09G 3/3283 327/108
2022/0291704 A1 9/2022 Abe et al.

FOREIGN PATENT DOCUMENTS

JP 2022141251 A 9/2022

OTHER PUBLICATIONS

Extended European Search Report (EESR) dated Apr. 17, 2025 for European Patent Application No. 24210785.2.

* cited by examiner

*Primary Examiner* — Gary L Laxton
(74) *Attorney, Agent, or Firm* — RANKIN, HILL & CLARK LLP

(57) ABSTRACT

A current output device has a plurality of current output units, an alternative current generation unit, a signal conversion unit, and an output current correction unit. The current output unit outputs, to an external circuit, an output current based on an output current signal that is input. The alternative current generation unit generates an alternative current, which is a current that substitutes for the output current of the current output unit, on the basis of a resistor arranged in an integrated circuit which also includes the current output units. The signal conversion unit converts the alternative current into a voltage signal on the basis of a reference resistor. The output current correction unit is arranged for each of the current output units and generates the output current signal on the basis of a difference between the voltage signal and a target value.

6 Claims, 5 Drawing Sheets

CURRENT OUTPUT DEVICE

CROSS-REFERENCE TO RELATED APPLICATION(S)

The present application claims priority to and incorporates by reference the entire contents of Japanese Patent Application No. 2023-191706 filed in Japan on Nov. 9, 2023.

FIELD

The present disclosure relates to a current output device.

BACKGROUND

Conventionally, a current output device that supplies a predetermined current for use in signal transmission or the like to a field device or the like has been used in a plant or a factory. For example, there has been proposed a current output module that generates a voltage according to an output current using a reference resistor, compares the voltage with a reference voltage, and controls the output current on the basis of a comparison result (see, for example, JP 2022-141251 A).

The current output module described above uses a reference resistor to detect an output current. This reference resistor is required to have relatively high accuracy. This is to reduce an error in detection of an output current.

However, in the above-described conventional technique, there is a problem that a highly accurate reference resistor is required for each channel in a case of being applied to a multi-channel current output device that simultaneously outputs a plurality of currents. For this reason, with the above-described conventional technique, there arises a problem of a cost increase.

The present disclosure provides a technique for simplifying a current output device that stabilizes a plurality of output currents.

SUMMARY

It is an object of the present invention to at least partially solve the problems in the conventional technology.

A current output device according to the present disclosure includes a plurality of current output units, an alternative current generation unit, a signal conversion unit and an output current correction unit. The current output unit outputs, to an external circuit, an output current based on an output current signal that is input. The alternative current generation unit generates an alternative current on the basis of a resistor arranged in an integrated circuit which also includes the current output units, the alternative current being a current that substitutes for the output current of the current output units. The signal conversion unit converts the alternative current into a voltage signal on the basis of a reference resistor. The output current correction unit is arranged for each of the current output units and generates the output current signal on the basis of a difference between the voltage signal and a target value.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENTS

Figure 1:
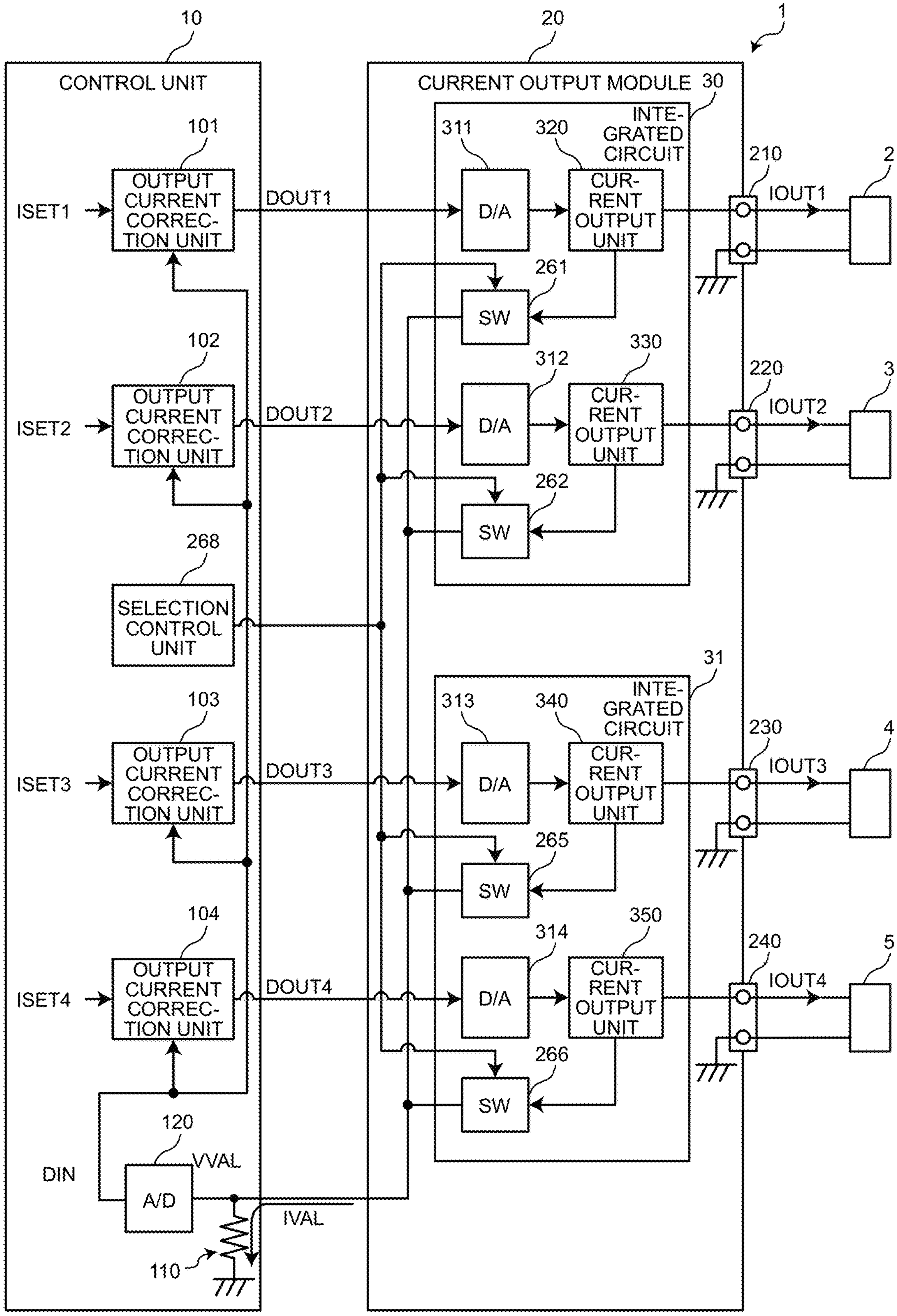
FIG. 1 is a diagram illustrating a configuration example of a current output device according to a first embodiment of the present disclosure.

In the following, embodiments of the present disclosure will be described in detail with reference to the drawings. The description will be given in the following order. In each of the following embodiments, the same parts are denoted by the same reference numerals to omit redundant description.

1. First Embodiment
2. Second Embodiment
3. Third Embodiment

1. First Embodiment

Configuration of Current Output Device

FIG. 1 is a diagram illustrating a configuration example of a current output device according to a first embodiment of the present disclosure. The drawing is a block diagram illustrating a configuration example of a current output device 1. The current output device 1 individually outputs a current to a plurality of field devices. The current output device 1 in the drawing includes four-channel current output units. Field devices 2 to 5 are illustrated in the drawing. The current output device 1 can individually output a predetermined current to the field devices 2 to 5.

The current output device 1 includes a control unit 10 and a current output module 20. The control unit 10 controls an output current of the current output module 20. The control unit 10 outputs output current signals (DOUT1 to DOUT4 in the drawing) that are control signals for the channels of the current output module 20, respectively. In addition, the control unit 10 performs feedback control on the basis of a current (alternative current to be described later) according to the output current for each channel from the current output module 20 to stabilize the output current of the current output module 20.

In addition, the current output module 20 generates a current for each channel and outputs the current to the field device 2 or the like via an output terminal. The current output module 20 in the drawing includes an output terminal 210, an output terminal 220, an output terminal 230, and an output terminal 240. The output terminal 210 is connected to the field device 2 to supply a current (IOUT1). The output terminal 220 is connected to the field device 3 to supply a current (IOUT2). The output terminal 230 is connected to the field device 4 to supply a current (IOUT3). The output terminal 240 is connected to the field device 5 to supply a current (IOUT4). In addition, in the current output module 20, a current output unit (a current output unit 320 or the like to be described later) corresponding to each of the output terminals 210 to 240 is arranged. The current output unit 320 and the like are connected to the output terminal 210 and the like, respectively. For example, one end of the output terminal 210 is connected to the current output unit 320, and the other end of the output terminal 210 is connected to a common GND.

The control unit 10 includes a plurality of output current correction units (output current correction units 101 to 104), a reference resistor 110, an analog-to-digital conversion unit 120, and a selection control unit 268. In this drawing, the "analog-to-digital conversion unit" is described as "A/D".

The output current correction unit 101 and the like are each arranged for each channel and output the output current signal that is a control signal on the basis of a difference between a target value and a voltage signal (DIN) according to the output current of a channel to which the output current correction unit itself corresponds. In the drawing, "ISET1", "ISET2", "ISET3", and "ISET4" represent target values of the output current correction units 101 to 104, respectively. Furthermore, "DOUT1", "DOUT2", "DOUT3", and "DOUT4" represent the output current signals of the output current correction units 101 to 104, respectively. Note that the output current correction unit 101 and the like in the drawing generate a digital output current signal. The output current correction unit 101 and the like control the current output unit 320 and the like so as to reduce the difference between the voltage signal (DIN) according to the output current and the target value.

The reference resistor 110 converts an alternative current (IVAL) output from the current output module 20 into a voltage signal (VVAL). Here, the alternative current is a current corresponding to the output current of the current output unit 320 or the like, and is a current that substitutes for the output current. The voltage signal (VVAL) can be generated by passing the alternative current through the reference resistor 110. Note that a circuit of the reference resistor 110 is an example of a "signal conversion unit" of the present disclosure.

The analog-to-digital conversion unit 120 performs analog-to-digital conversion on the above-described voltage signal (VVAL) to generate the voltage signal (DIN).

The selection control unit 268 controls selection of an alternative current in the current output module 20. The above-described alternative current is generated for each of current output units 320 to 350. One of the plurality of alternative currents is selected and output from the current output module 20. The selection control unit 268 controls the selection of the alternative current.

The current output module 20 includes the above-described output terminals 210 to 240, a plurality of digital-to-analog conversion units (digital-to-analog conversion units 311 to 314), and the plurality of current output units (the current output unit 320, the current output unit 330, the current output unit 340, and the current output unit 350). In this drawing, the "digital-to-analog conversion unit" is described as "D/A". In addition, the current output module 20 further includes a plurality of alternative current generation units (an alternative current generation unit 390 to be described later) and switch elements 261, 262, 265, and 266. In this drawing, the "switch element" is described as "SW". Note that the current output units 320 and 330, the digital-to-analog conversion units 311 and 312, and the switch elements 261 and 262 are arranged in an integrated circuit 30. In addition, the current output units 340 and 350, the digital-to-analog conversion units 313 and 314, and the switch elements 265 and 266 are arranged in an integrated circuit 31.

The digital-to-analog conversion unit 311 and the like convert a digital output current signal output from the output current correction unit 101 and the like into an analog output current signal. The converted output current signal is output to the current output unit 320 or the like. Specifically, the digital-to-analog conversion unit 311 converts the DOUT1 into an analog signal and outputs the analog signal to the current output unit 320. The digital-to-analog conversion unit 312 converts the DOUT2 into an analog signal and outputs the analog signal to the current output unit 330. The digital-to-analog conversion unit 313 converts the DOUT3 into an analog signal and outputs the analog signal to the current output unit 340. The digital-to-analog conversion unit 314 converts the DOUT4 into an analog signal and outputs the analog signal to the current output unit 350. Note that the digital-to-analog conversion units 311 and 312 can also be arranged outside the integrated circuit 30. Similarly, the digital-to-analog conversion units 313 and 314 can also be arranged outside the integrated circuit 31.

The current output unit 320 or the like generates an output current on the basis of an output current signal and outputs the output current to the field device 2 or the like via the output terminal 210 or the like. Specifically, the current output unit 320 outputs a current via the output terminal 210. The current output unit 330 outputs a current via the output terminal 220. The current output unit 340 outputs a current via the output terminal 230. The current output unit 350 outputs a current via the output terminal 240. In addition, the current output unit 320 and the like generate alternative currents of their own output currents, respectively. Details of the configuration of the current output unit 320 and the like will be described later.

The switch element 261 or the like is a switch that is arranged on a signal line to which an alternative current is supplied and that causes the alternative current to be output. Specifically, the switch element 261 corresponds to an alternative current of the current output unit 320, the switch element 262 corresponds to an alternative current of the current output unit 330, the switch element 265 corresponds to an alternative current of the current output unit 340, and the switch element 266 corresponds to an alternative current of the current output unit 350. An alternative current can be selected by conducting electricity to any of these switch elements 261 and the like. The selected alternative current is output from the current output module 20 as the above-described IVAL. The selection control unit 268 controls electrical continuity of the switch elements 261, 262, 265, and 266. A MOS transistor can be applied to the switch element 261 and the like. Note that the selection control unit 268 and circuits of the switch elements 261, 262, 265, and 266 are an example of a "selection unit" of the present disclosure.

An alternative current of a channel selected by the selection control unit 268, the switch element 261, and the like is fed back to the corresponding output current correction unit 101 and the like via the reference resistor 110 and the analog-to-digital conversion unit 120 to correct an output current. By performing this procedure sequentially for all the channels, accuracy of the output currents IOUT1 to IOUT4 can be improved.

Configuration of Current Output Unit

Figure 2:
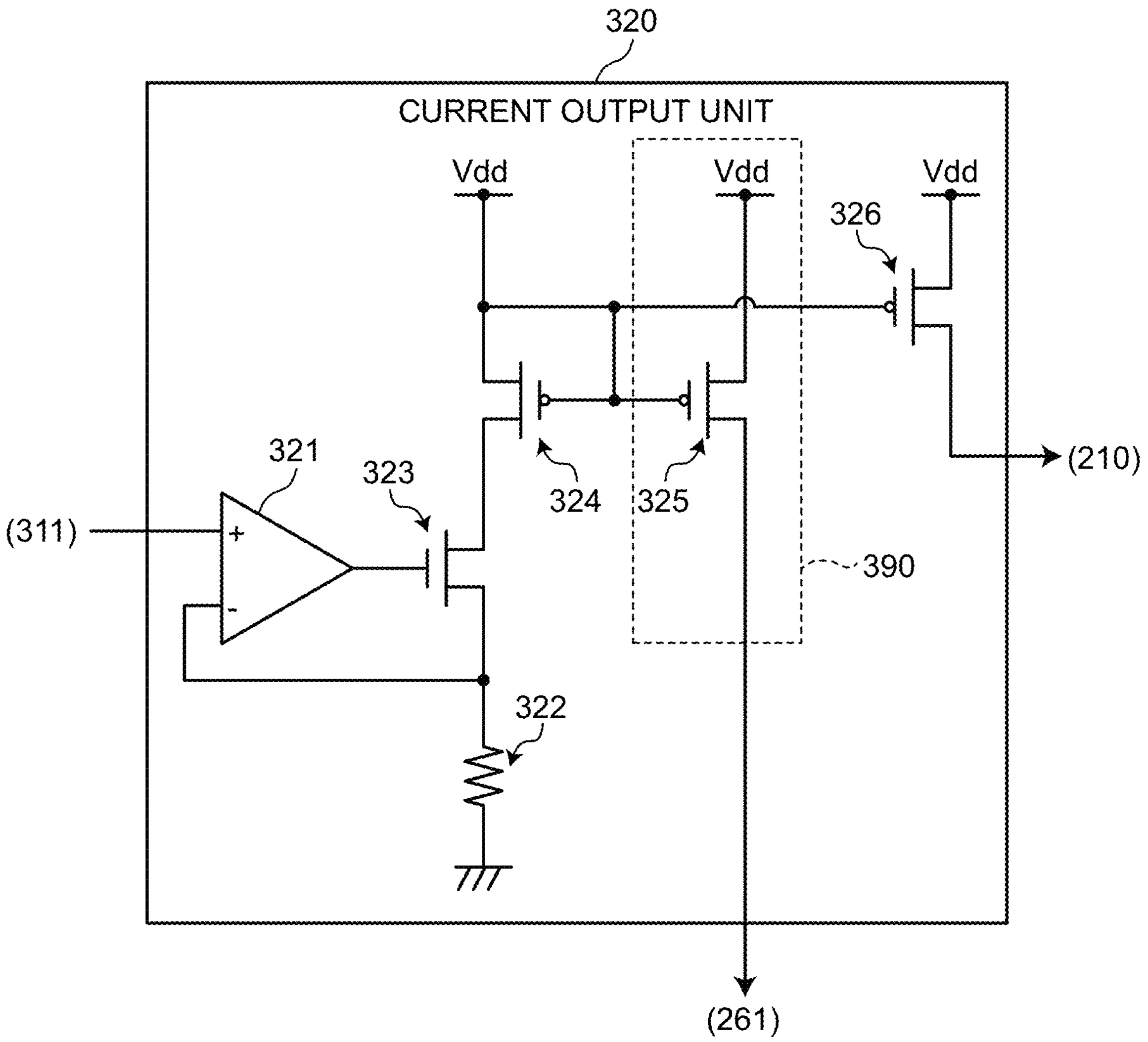
FIG. 2 is a diagram illustrating a configuration example of a current output unit according to the first embodiment of the present disclosure.

FIG. 2 is a diagram illustrating a configuration example of the current output unit according to the first embodiment of the present disclosure. The drawing is a circuit diagram illustrating a configuration example of the current output unit 320. Note that the current output unit 330 and the like can have the same configuration.

The current output unit 320 includes an operational amplifier 321, a resistor 322, and MOS transistors 323 to 326. As the MOS transistor 323, an n-channel MOS transistor can be applied. Furthermore, a p-channel MOS transistor can be applied to the MOS transistors 324 to 326. In addition, a power supply line Vdd is arranged in the current output unit 320.

A signal line from the digital-to-analog conversion unit 311 is connected to a non-inverting input of the operational amplifier 321. An output of the operational amplifier 321 is connected to a gate of the MOS transistor 323. A source of the MOS transistor 323 is connected to an inverting input of the operational amplifier 321 and to one end of the resistor 322. The other end of the resistor 322 is connected to a common GND. A drain of the MOS transistor 323 is connected to a drain of the MOS transistor 324. The gate of the MOS transistor 324 is connected to a source of the MOS transistor 324, a gate of the MOS transistor 325, a gate of the MOS transistor 326, and the power supply line Vdd. The MOS transistor 325 has a source connected to the power supply line Vdd and a drain connected to a wiring to the switch element 261. The MOS transistor 326 has a source connected to the power supply line Vdd and a drain connected to a wiring to the output terminal 210.

A circuit of the operational amplifier 321, the MOS transistor 323, and the resistor constitute a voltage-current conversion circuit. A current according to the output current signal from the digital-to-analog conversion unit 311 is generated on the basis of the resistor 322, and is output as a drain current of the MOS transistor 323.

The MOS transistor 324 and the MOS transistor 326 constitute a current mirror circuit. The MOS transistor 324 has a gate connected to its own source. A drain current of the MOS transistor 324 is mirrored to the MOS transistor 326 as a reference current. This reference current corresponds to the drain current of the MOS transistor 323. Therefore, a drain current of the MOS transistor 326 becomes a current based on the output current signal. By equalizing channel sizes of the MOS transistor 324 and the MOS transistor 326, a mirror ratio can be set to 1:1. Note that the MOS transistor 324 is an example of a "first transistor" of the present disclosure. The MOS transistor 326 is an example of a "second transistor" of the present disclosure.

Furthermore, the MOS transistor 325 is further connected to the current mirror circuit described above. The reference current is also mirrored to the MOS transistor 325. Therefore, a drain current of the MOS transistor 325 also becomes a current based on the output current signal. In addition, the drain current of the MOS transistor 326 and the drain current of the MOS transistor 325 become currents of a ratio according to the respective channel sizes and the like. Therefore, the drain current of the MOS transistor 325 can be used as an alternative to the drain current of the MOS transistor 326, i.e., as the output current. By changing the size of the channel of the MOS transistor 325 with respect to the channel size of the MOS transistor 324, a desired ratio of alternative currents can be generated. Thus, an alternative current can be generated by a circuit of the MOS transistor 325. Note that the circuit including the MOS transistor 325 constitute the alternative current generation unit 390. The MOS transistor 325 is an example of a "third transistor" of the present disclosure.

In this manner, an alternative current can be generated on the basis of the resistor 322. Furthermore, since the resistor 322 is arranged also in other current output unit 330 or the like, an alternative current can be generated for each of the current output units 320 to 350. Since the resistor 322 is a resistor formed in the integrated circuit 30 or the like, a variation in a resistance value of the resistor 322 in each current output unit 320 is reduced. Therefore, feedback control can be performed using an alternative current instead of the output current. In addition, the output current and the alternative current include an error based on the variation of the resistor 322. However, these errors can be reduced (compressed) by an action of a feedback control system including the circuit of the reference resistor 110 of FIG. 1. Note that in order to reduce an error of the feedback control system, it is necessary to use a resistor with high accuracy as the reference resistor 110 in FIG. 1. However, a highly accurate resistor is not required for the plurality of resistors 322. Therefore, an increase in cost of the current output device 1 can be reduced.

In addition, the current output device 1 selects an alternative current from the plurality of current output units 320 and the like by a circuit of the switch element 261 and the like and inputs the selected alternative current to the circuit of the reference resistor 110 and the analog-to-digital conversion unit 120. Therefore, the configuration of the current output device 1 can be simplified as compared with a case where the circuit of the reference resistor 110 and the analog-to-digital conversion unit 120 are arranged for each channel. This can reduce an increase in cost of the current output device 1.

2. Second Embodiment

The current output device 1 of the first embodiment described above generates an alternative current on the basis of the resistor 322 arranged in the current output unit 320. In addition, since feedback control including the digital-to-analog conversion unit 311 and the like in a loop is performed, there is a problem that a response speed is relatively slow. By contrast, a current output device 1 according to a second embodiment of the present disclosure is different from the above-described first embodiment in that an alternative current is generated on the basis of a resistor arranged in an integrated circuit 30 or the like.

Configuration of Current Output Device

Figure 3:
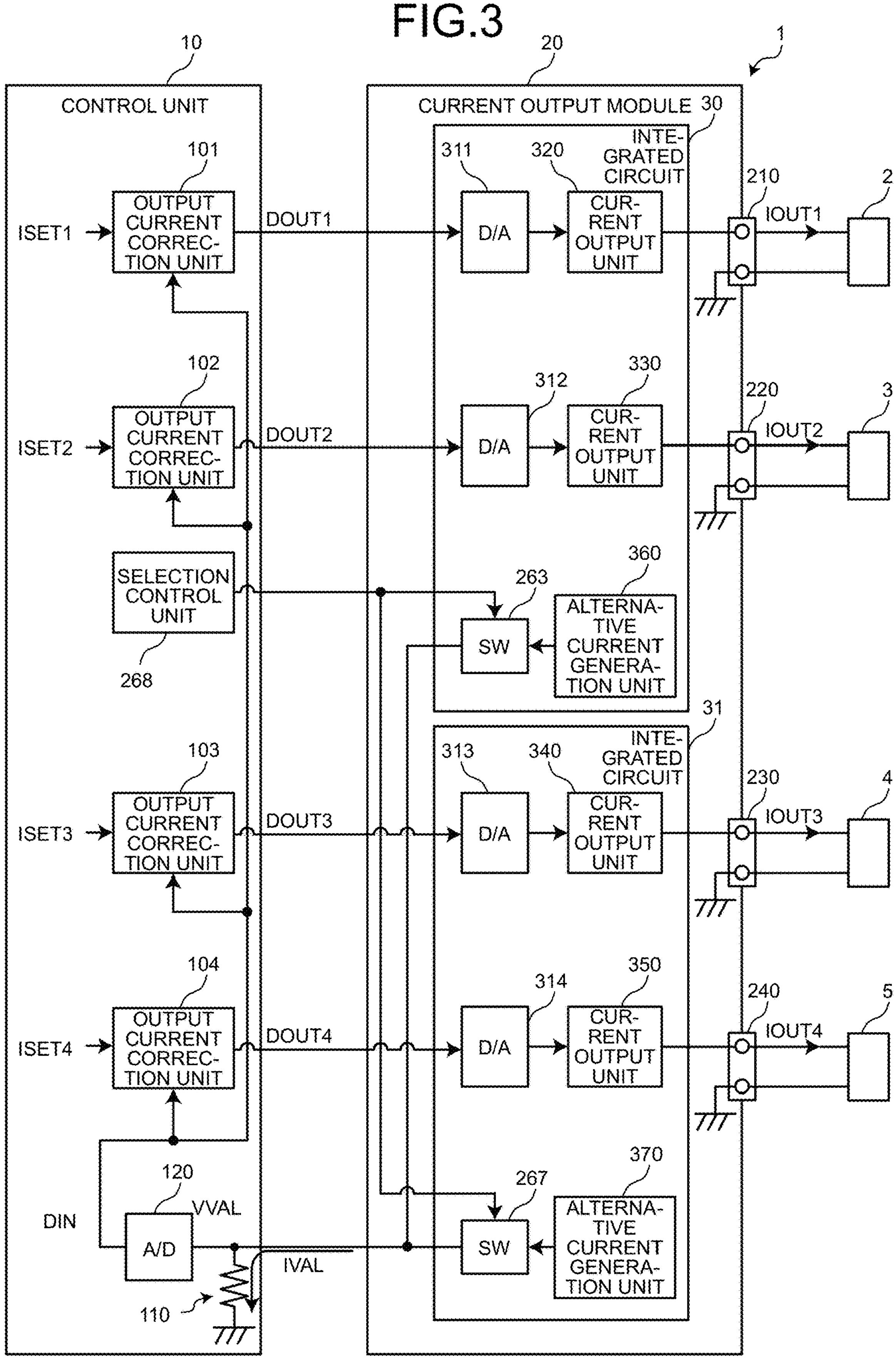
FIG. 3 is a diagram illustrating a configuration example of a current output device according to a second embodiment of the present disclosure.

FIG. 3 is a diagram illustrating a configuration example of the current output device according to the second embodiment of the present disclosure. The drawing is a block diagram illustrating a configuration example of the current output device 1 similarly to FIG. 1. The current output device 1 in the drawing is different from the current output device 1 in FIG. 1 in including switch elements 263 and 267 and alternative current generation units 360 and 370 instead of the switch elements 261, 262, 265, and 266.

The alternative current generation units 360 and 370 generate an alternative current similarly to the alternative current generation unit 390 in FIG. 2. The alternative current generation unit 360 or the like generates an alternative current on the basis of its own resistor. The alternative current generation unit 360 is arranged in the integrated circuit 30, and the alternative current generation unit 370 is arranged in an integrated circuit 31. Note that, in the integrated circuit 30, current output units 320 and 330 and the alternative current generation unit 360 are assumed to be configured on the same semiconductor chip. Similarly, in the integrated circuit 31, current output units 340 and 350 and the alternative current generation unit 370 are assumed to be configured on the same semiconductor chip.

The switch elements 263 and 267 are switches that are arranged in the signal line to which an alternative current is supplied and to which the alternative current is output.

Specifically, the switch element 263 corresponds to an alternative current of the alternative current generation unit 360, and the switch element 267 corresponds to an alternative current of the alternative current generation unit 370.

Note that the alternative current generation unit 390 can be omitted from the current output unit 320 or the like in the drawing.

Configuration of Alternative Current Generation Unit

Figure 4:
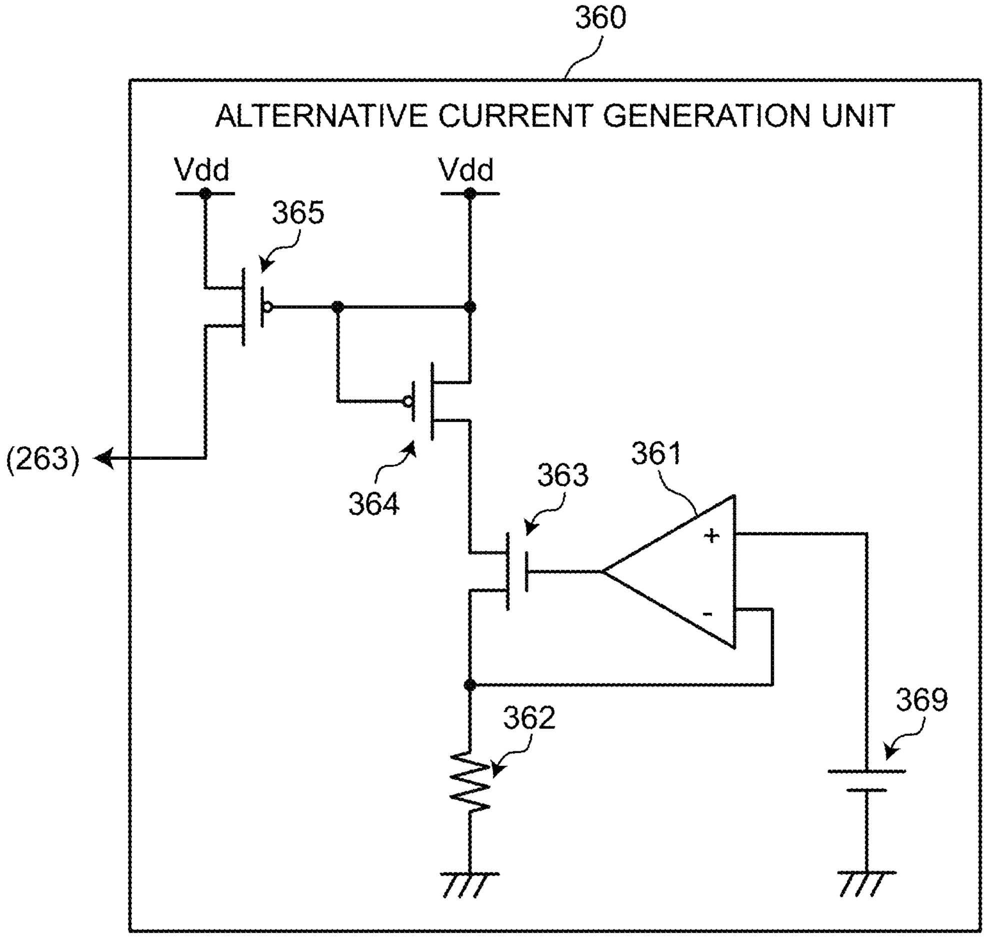
FIG. 4 is a diagram illustrating a configuration example of an alternative current generation unit according to the second embodiment of the present disclosure.

FIG. 4 is a diagram illustrating a configuration example of the alternative current generation unit according to the second embodiment of the present disclosure. The drawing is a circuit diagram illustrating a configuration example of the alternative current generation unit 360. Note that the alternative current generation unit 370 can have the same configuration.

The alternative current generation unit 360 includes an operational amplifier 361, a resistor 362, MOS transistors 363 to 365, and a voltage source 369. As the MOS transistor 363, an n-channel MOS transistor can be applied. As the MOS transistors 364 and 365, a p-channel MOS transistor can be applied. In the alternative current generation unit 360, a power supply line Vdd is arranged.

The voltage source 369 has a low potential side terminal connected to a common GND and a high potential side terminal connected to a non-inverting input of the operational amplifier 361. The operational amplifier 361 has an output connected to a gate of the MOS transistor 363. The MOS transistor 363 has a source connected to an inverting input of the operational amplifier 361 and to one end of the resistor 362. The resistor 362 has the other end connected to the common GND. The MOS transistor 363 has a drain connected to a drain of the MOS transistor 364. The MOS transistor 364 has a gate connected to a source of the MOS transistor 364, a gate of the MOS transistor 365, and the power supply line Vdd. The MOS transistor 365 has a source connected to the power supply line Vdd, and a drain connected to a wiring to the switch element 263.

The MOS transistors 364 and 365 constitute a current mirror circuit. Furthermore, a circuit of the operational amplifier 361, the MOS transistor 363, and the resistor 362 constitute a voltage-current conversion circuit. An output voltage of the voltage source 369 corresponds to the reference voltage. A drain current of the MOS transistor 363 becomes a current based on a voltage of the voltage source 369 and the resistor 362. This drain current becomes a reference current of the current mirror circuit and is mirrored to the MOS transistor 365. A drain current of the MOS transistor 365 is output as an alternative current. Since the resistor 362 is a resistor arranged in an integrated circuit 30 which also includes the resistor 322 of the current output unit 320, it has characteristics similar to those of the resistor 322. Specifically, a variation in resistance values of the resistor 362 and the resistor 322 is reduced. In addition, a change in the resistance value due to a temperature drift of each of the resistor 362 and the resistor 322 is also substantially equal. Therefore, instead of the alternative current based on the resistor 322, a current based on the resistor 362 can be used as an alternative current.

In this manner, an alternative current can be generated on the basis of the resistor 362. Since the resistor 362 does not require a resistor with high accuracy, an increase in cost of the current output device 1 can be reduced. In addition, an alternative current from the integrated circuit 30 or the like is selected by circuits of the switch elements 263 and 267 and input to the circuit of the reference resistor 110 and to the analog-to-digital conversion unit 120. Therefore, the configuration of the current output device 1 can be simplified as compared with a case where the circuit of the reference resistor 110 and the analog-to-digital conversion unit 120 are arranged for each channel. In addition, since the digital-to-analog conversion unit 311 is not included in a control system as compared with the current output device 1 of FIG. 1, the current output device 1 according to the second embodiment of the present disclosure can improve a response speed.

The remaining configurations of the current output device 1 are similar to those of the current output device 1 according to the first embodiment of the present disclosure, and thus description thereof will be omitted.

3. Third Embodiment

Description will be made of a modification of the current output device 1 of the first embodiment described above.

Configuration of Current Output Device

Figure 5:
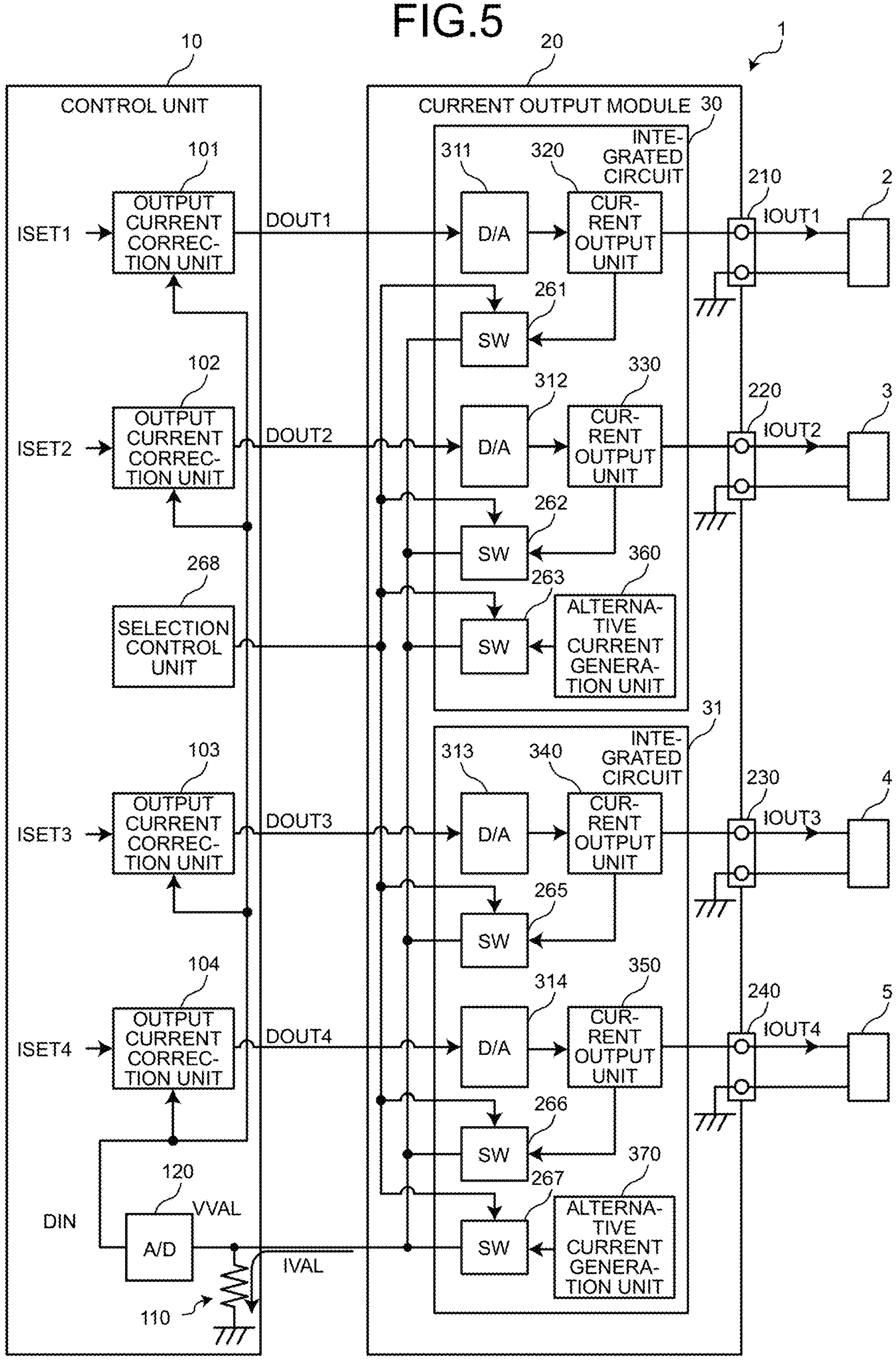
FIG. 5 is a diagram illustrating a configuration example of a current output device according to a third embodiment of the present disclosure.

FIG. 5 is a diagram illustrating a configuration example of a current output device according to a third embodiment of the present disclosure. The drawing is a block diagram illustrating a configuration example of the current output device 1 similarly to FIG. 1. The current output device 1 in the drawing is different from the current output device 1 of FIG. 1 in further including switch elements 263 and 267 and alternative current generation units 360 and 370.

The current output device 1 in the drawing includes the alternative current generation unit 390 in FIG. 2 and the alternative current generation units 360 and 370. Therefore, the current output device 1 in the drawing can selectively use an alternative current generated by the alternative current generation unit 390 and the alternative current generation units 360 and 370. For example, in a case where an output current is controlled with relatively high accuracy, an alternative current from the alternative current generation unit 390 arranged for each current output unit 320 can be selected, and in a case where a relatively quick response is required, an alternative current from the alternative current generation unit 360 or the like can be selected.

The remaining configurations of the current output device 1 are similar to those of the current output device 1 according to the first embodiment of the present disclosure, and thus description thereof will be omitted.

Although the embodiments of the present disclosure have been described in the foregoing, the technical scope of the present disclosure is not limited to the above-described embodiments as they are, and various modifications can be made without departing from the gist of the present disclosure. In addition, the components of different embodiments and modifications may be appropriately combined.

Note that the effects recited in the present specification are merely examples and are not limited, and other effects may be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Some examples of combinations of the disclosed technical features are recited below.

(1) A current output device comprising:

a plurality of current output units that outputs, to an external circuit, an output current based on an output current signal that is input;

an alternative current generation unit that generates an alternative current on the basis of a resistor arranged in an integrated circuit which also includes the current output units, the alternative current being a current that substitutes for the output current of the current output units;

a signal conversion unit that converts the alternative current into a voltage signal on the basis of a reference resistor; and an output current correction unit that is arranged for each of the current output units and generates the output current signal on the basis of a difference between the voltage signal and a target value.

(2) The current output device according to the above (1), further comprising a plurality of the alternative current generation units.

(3) The current output device according to the above (2), further comprising a selection unit that selects a plurality of the alternative currents respectively generated by the plurality of alternative current generation units, wherein the signal conversion unit converts the alternative current selected by the selection unit into the voltage signal.

(4) The current output device according to any one of the above (1) to (3), wherein the resistor is arranged in each of the current output units, and the current output unit includes a current mirror circuit having a first transistor in which a reference current flows and a second transistor in which the output current obtained by mirroring of the reference current flows, and a current generated on the basis of the output current signal and the resistor is supplied to the current mirror circuit as the reference current.

(5) The current output device according to the above (4), wherein the alternative current generation unit includes a third transistor that is connected to the current mirror circuit to mirror the reference current.

(6) The current output device according to any one of the above (1) to (3), wherein the alternative current generation unit generates the alternative current on the basis of a predetermined reference voltage and the resistor.

What is claimed is:

1. A current output device comprising:

a plurality of current output units that outputs, to an external circuit, an output current based on an output current signal that is input;

an alternative current generation unit that generates an alternative current on the basis of a resistor arranged in an integrated circuit which also includes the current output units, the alternative current being a current that substitutes for the output current of the current output units;

a signal conversion unit that converts the alternative current into a voltage signal on the basis of a reference resistor; and an output current correction unit that is arranged for each of the current output units and generates the output current signal on the basis of a difference between the voltage signal and a target value.

2. The current output device according to claim 1, further comprising a plurality of the alternative current generation units.

3. The current output device according to claim 2, further comprising a selection unit that selects a plurality of the alternative currents respectively generated by the plurality of alternative current generation units, wherein the signal conversion unit converts the alternative current selected by the selection unit into the voltage signal.

4. The current output device according to claim 1, wherein the resistor is arranged in each of the current output units, and the current output unit includes a current mirror circuit having a first transistor in which a reference current flows and a second transistor in which the output current obtained by mirroring of the reference current flows, and a current generated on the basis of the output current signal and the resistor is supplied to the current mirror circuit as the reference current.

5. The current output device according to claim 4, wherein the alternative current generation unit includes a third transistor that is connected to the current mirror circuit to mirror the reference current.

6. The current output device according to claim 1, wherein the alternative current generation unit generates the alternative current on the basis of a predetermined reference voltage and the resistor.

* * * * *